United States Patent Office 3,520,649
Patented July 14, 1970

3,520,649
SYSTEM FOR REMOVAL OF $SO_2$ AND FLY ASH FROM POWER PLANT FLUE GASES
James P. Tomany, Darien, Conn., and Wilfred A. Pollock, Cudahy, Wis., assignors of one-half each to Universal Oil Products Company, Des Plaines, Ill., a corporation of Delaware, and to Wisconsin Electric Power Company, Milwaukee, Wis., a corporation of Wisconsin
Filed Sept. 28, 1967, Ser. No. 671,287
Int. Cl. B01d 47/00; C01b 17/56
U.S. Cl. 23—2                     10 Claims

ABSTRACT OF THE DISCLOSURE

An $SO_2$ and fly ash removal system for coal burning power plant stack gases which provides for limestone-dolomite addition to the coal carrying through the power plant to form stable sulfate-sulfite compounds and unstable calcium and magnesium oxides which will carry along with the fly ash particles to a scrubbing zone. The fly ash and the sulfate-sulfite compounds are countercurrently contacted with a descending alkaline scrubbing stream in the presence of self-cleaning mobile contact elements in the scrubbing zone to effect the absorption of $SO_2$ and physical removal of fly ash and the stable sulfate and sulfite materials. The continuously circulating alkaline stream used in the scrubbing zone is obtained in part from the reaction of portions of the calcium and magnesium carbonates and oxides from the limestone-dolomite addition, with recirculating water.

---

Figure 1:
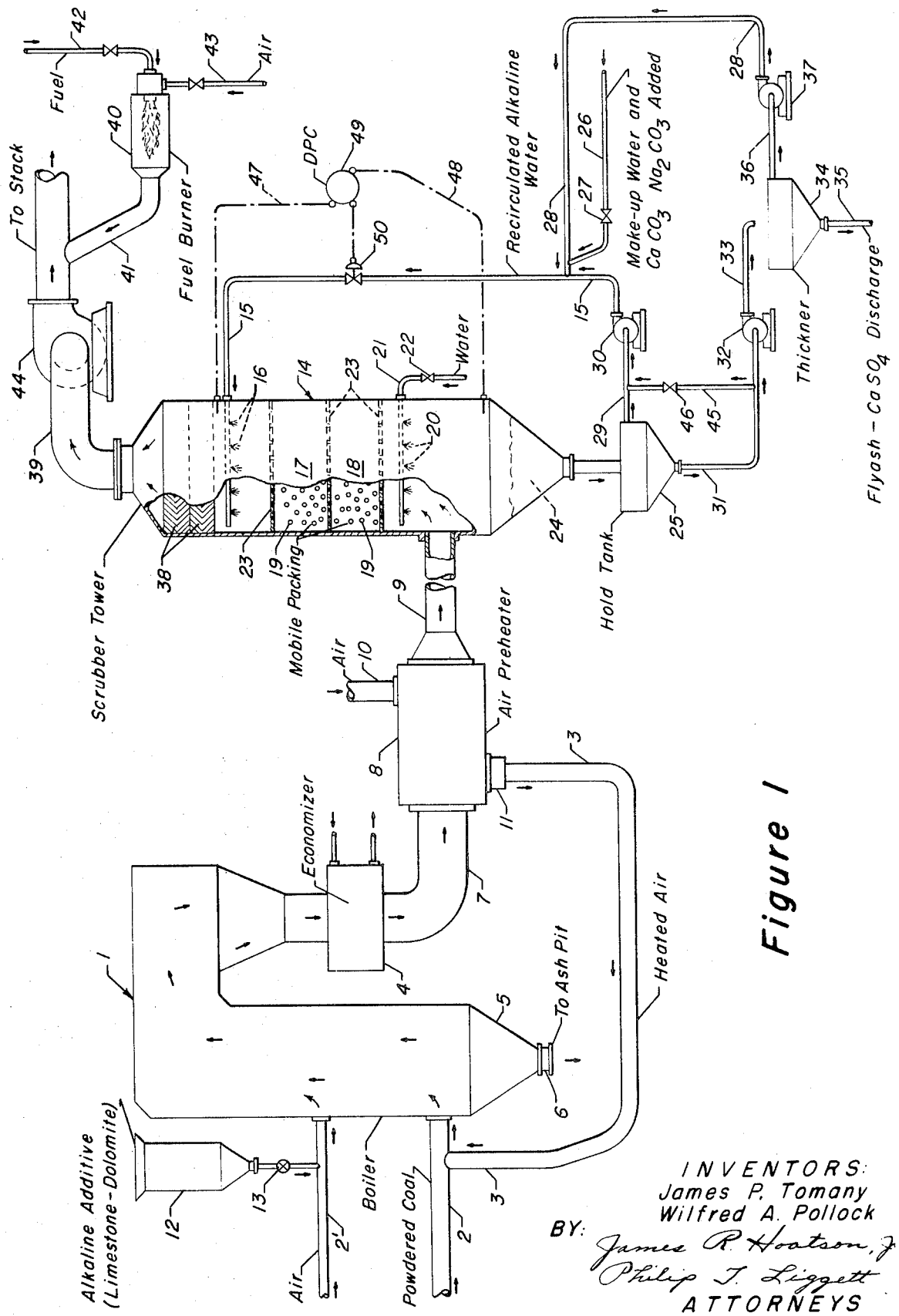

The present invention relates to the use of low cost added alkaline materials in a system which provides for the wet scrubbing of coal burning power plant flue gases. More specifically, the invention is directed to an improved flue gas scrubber system for sulfur dioxide and fly ash-sulfates removal through the addition of powdered limestone and/or dolomite to a coal burning power plant unit such that an alkaline scrubbing stream is provided in part from the calcium and magnesium compounds being added to the boiler zone and carried along with the fly ash and flue gas stream.

There are, of course, many schemes and systems which have been used and/or proposed for the collection and removal of fly ash and noxious components from power plant stack gases. The removal of fly ash from flue gas streams has been accomplished primarily by the use of mechanical separator or electrical precipitator means. For instance, present day improved electrical precipitators and combinations of mechanical separators and electrical precipitators are providing 99% plus efficiencies in the removal of fly ash but are of no use in removing abnoxious gases. On the other hand, while conventional types of wet scrubbers are of advantage for noxious gases, they have problems in handling gaseous streams with fly ash. However, since at the present time, new air pollution standards are requiring that sulfur dioxide ($SO_2$), in particular, be almost entirely prevented from being discharged to the atmosphere and it is necessary to have economical and practicable methods of reducing $SO_2$ from stack gases, as well as means to remove the fly ash. For this reason, an improved mobile bed wet scrubbing system appears to provide one of the best solutions for the overall cleanup of power plant stack gases.

It is also realized that several processes have been publicized as being available for the removal of $SO_2$ from a flue gas stream while, at the same time, providing for sulfur recovery, or for sulfuric acid production, as an integrated step in a particular overall process. However, in many instances, as for example with large power plants operated by the utility companies, there is no immediate interest in chemical recovery operations and, as a result, there is an emphasis on the desire to have an efficient and economical system which will strictly satisfy air pollution problems. With the use of a wet scrubbing system, where there may be a substantial discharge of water and dissolved treating materials in the liquor effluent, and with economy in mind, it necessarily follows that low cost treating compounds must be a part of any improved system. For this reason, it is of particular advantage to use a low cost, naturally occurring material to assist in the $SO_2$ removal operation.

Thus, it may be considered a principal object of the present invention to provide an improved stack gas scrubbing system which incorporates a step of adding a low cost powdered alkaline material, such as limestone and/or dolomite, into the furnace or boiler at an optimum zone, whereby there is minimization of corrosion in the entire gas discharge system, some formation of stable sulfates and sulfites which can be scrubbed out of the gas stream, and a direct formation, at least in part, of an alkaline scrubbing liquid in the scrubber zone of the system for effecting the absorption of $SO_2$.

Another object of the present invention is to provide an economical stack gas cleaning system which reduces the presence of nitrogen oxides, along with an $SO_2$ absorption step, as well as effect fly ash and sulfates removal.

A still further object of the invention is to integrate an improved form of mobile packing type of wet scrubber unit into a stack gas treating system whereby to enhance the $SO_2$ and solids removal from the waste gas stream.

Briefly, the present invention embodies a system for simultaneously removing $SO_2$ and fly ash from a flue gas stream resulting from the burning of coal, which comprises the steps of, introducing a powdered alkaline material into the coal burning furnace and thereby producing sulfate, sulfite and oxide materials which will carry along with fly ash particles in a resulting flue gas stream, introducing such resulting gaseous stream and entrained materials into a scrubbing zone to pass countercurrently to a recirculating and descending alkaline scrubbing slurry stream, with the alkalinity of the latter being obtained in part from the reaction of at least a portion of the alkaline material carrying through from the furnace to a recirculating aqueous stream and, in addition, effecting such countercurrent scrubbing step in at least one stage using the presence of a multiplicity of mobile contact elements, effect the removal of recovered fly ash material and resulting precipitated sulfates and sulfites from the lower portion of said scrubbing zone and from said recirculating scrubbing stream, and, at the same time, permitting the discharge of a substantially cleaned flue gas stream from the upper portion of said scrubbing zone.

A preferred overall operation, as noted hereinbefore, utilizes a relatively low cost alkaline material such as limestone and/or dolomite, the latter providing both calcium carbonate and magnesium carbonate. Both materials occur in nature and are readily available at low cost so as to provide an economical overall treating system, even though relatively large quantities of the additive material may be disposed of and wasted. The present system also makes use of the addition of the alkaline material into the boiler furnace zone of the power plant such that the limestone and/or dolomite carried through the major portion of the boiler and subsequent duct work is in a calcined form.

Actually, in the high temperature burning zone or boiler zone, it appears that resulting calcium and magnesium oxides from the limestone and dolomite additive materials combine with about half of the $SO_2$ present in the flue gas stream to form calcium and magnesium sulfates and sulfite compounds. However, some portion of the additive materials that are calcined to the relatively active calcium and magnesium oxides, which do not react with $SO_2$ and which carry along with the flue gas stream, will subsequently revert to the calcium carbonate and magnesium carbonate form before entering the scrubbing zone because of lower temperature conditions. In the scrubbing zone, itself, the stable sulfate and sulfite materials are scrubbed out of the flue gas stream along with the fly ash material while, of course, the $SO_2$ is absorbed by an alkaline slurry which is continuously circulated through the scrubbing zone in a manner to pass countercurrently with respect to the gaseous stream.

Although the invention need not be limited, the countercurrent scrubbing zones and, in particular, scrubbers which utilize mobile contact elements that provide large surface area contacting with both the gas and liquid stream are preferred. Movable elements which are free to move and rub against one another whereby to eliminate entrained solids, have been found to be particularly effective in reducing the sulfur dioxide content from the waste gas stream. This preferred form of scrubber design and its operation will be described, hereinafter, in somewhat greater detail. Combined with the scrubbing step, it is, of course, a particular feature of the present invention to have powdered alkaline material(s) introduced to the boiler or burning zone in order that the portion of unreacted oxides (subsequently partially reverting to carbonates) will carry through as alkaline material into the scrubbing zone to provide a portion of the alkalinity of the recirculated slurry stream being utilized in such scrubbing zone to effect the removal of the entrained sulfur dioxide.

The absorption of sulfur dioxide depends primarily on maintaining a high mass-transfer rate, with the driving force for the mass transfer being the difference between the partial pressure of a solute gas in the total gas stream and the vapor pressure of the solute gas above the absorbing solution. Where the sulfur dioxide in the flue gas stream is in a relatively low concentration of from about 0.05 to about 0.20 volume percent, there is only an approximate 1 millimeter of mercury pressure for such solute gas. Thus, for the absorption of the sulfur dioxide to proceed readily in the scrubbing solution, the latter must be maintained in a condition with a pH in the range of about 5.0 to about 7.0 so that there will be formed the desired monosulfide in the slurry material. A lower pH raises the $SO_2$ vapor pressure until the driving force for the mass transfer is eliminated. Although the alkalinity in the scrubbing slurry stream will be provided at least in part by the dissolving of some portion of the calcium and magnesium carbonate and oxide materials into the continuously recirculating aqueous stream, there may be the addition of other alkaline materials, for example calcium hydroxide, calcium carbonate, sodium carbonate, etc. Still other alkaline materials may be added to the treating system at the scrubbing zone; however, additive materials other than limestone and dolomite may have a high first cost and will normally be added only into the scrubber zone, rather than be introduced into the boiler zone. With respect to the quantity of additive alkaline material, limestone and/or dolomite generally will be about 10% or more, by weight, of the powdered coal passing into the power plant unit. Unless sulfur content of the coal is extremely low, amounts substantially less than 10% appear to provide rather low efficiencies of $SO_2$ removal and will probably not meet air pollution codes that may be imposed upon a particular area. On the other hand, greater than 10% limestone-dolomite additions may be desirable with furnaces or boilers operating with high sulfur coals.

In effecting the actual countercurrent gas liquid scrubbing, it is preferred that there be a scrubbing zone, such as hereinbefore referred to, which utilizes mobile light weight contact elements and maintains gas flows of the order of 600 to 1,000 feet per minute upwardly through vertically oriented contact zones, while liquid rates are of the order of 5 to 50 gallons per minute per square foot of area down through such zones. Preferably, the flow rates maintained through the wet scrubber section(s), which have one or more stages, will be such that the multiplicity of contact elements are in a turbulent random motion providing a high degree of individual rotation of elements and their constant exposure to both of the countercurrently moving gas and liquid streams. Generally, the contact elements will comprise light weight hollow spherical elements, with a size range of about 1" to 4" in diameter and a specific gravity in the range of 0.1 to about 0.9. For example, hollow plastic spheres may have a density of the order of about 6 pounds per cubic foot, when in a state of rest. Polypropylene or plastic spheres are quite suitable for low temperature ranges in the scrubber zone; however, where temperatures are too high for plastics, then hollow metal spheres may well be used. Generally, perforated sphere-retaining grids, with at least about 40% open area, will be used above and below each stage of contact elements to limit or define their range of movement. In addition to $SO_2$ removal, it appears that the present combined system utilizing the limestone-dolomite injection and the scrubbing from a resulting alkaline recirculated slurry stream, is particularly effective in removing at least 20% or more of any entrained nitrogen oxides which may be formed in the boiler zone and are carried along with the waste gas stream. Still other advantageous features will be noted in connection with the following description of the accompanying drawings.

FIG. 1 is a diagrammatic drawing of one embodiment of the present improved $SO_2$ and fly ash removal system.

Figure 2:
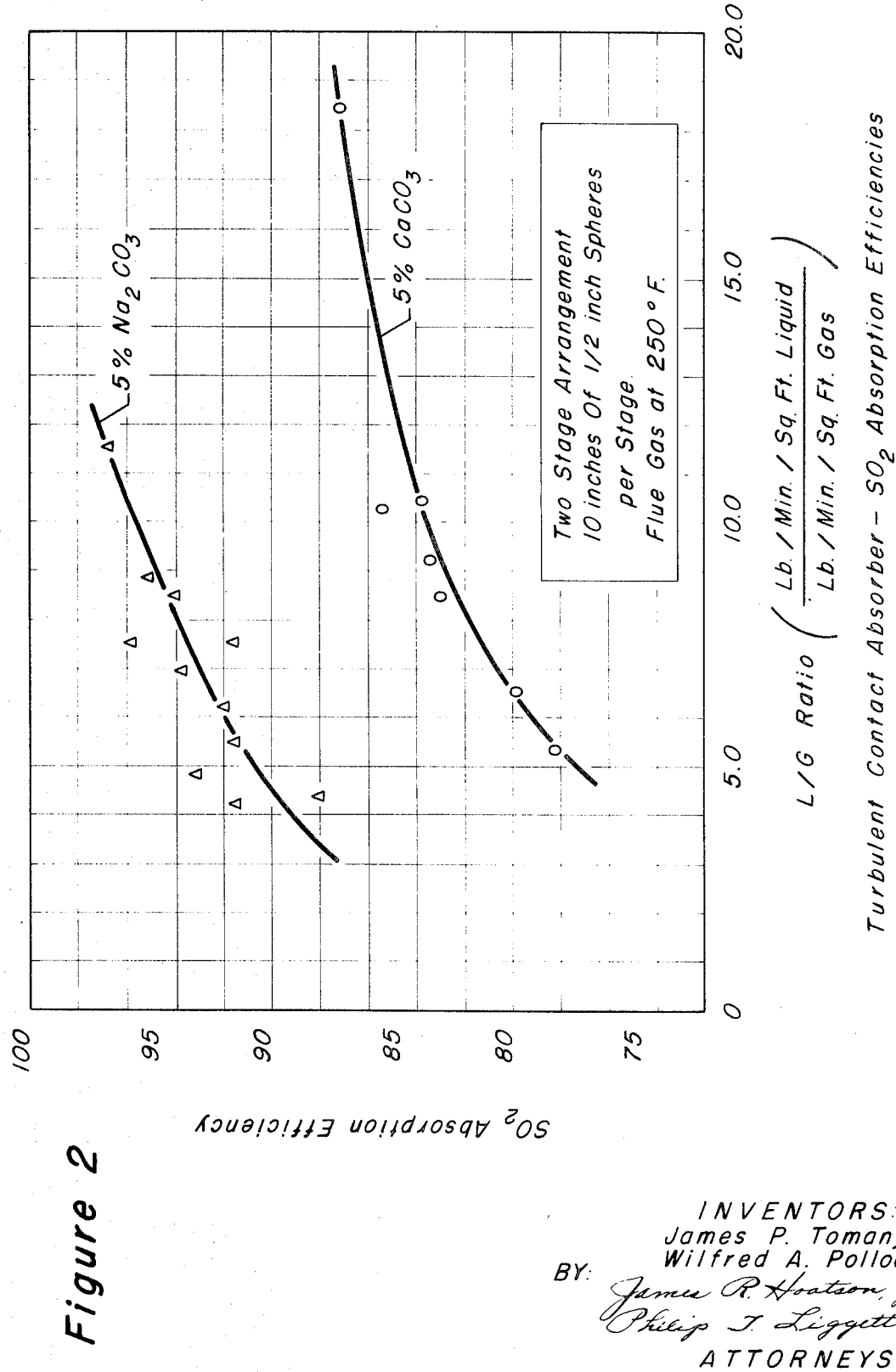

FIG. 2 of the drawing shows comparative curves for $SO_2$ absorption with different alkaline liquors in the scrubber section of the system.

Referring now particularly to FIG. 1 of the drawing, there is shown a boiler or furnace zone 1 having a fuel inlet means 2 suitable for introducing powdered coal and a heated air stream, which in turn is shown as being carried to such inlet by way of duct 3. In a usual arrangement, the powdered coal and forced draft air stream carries upwardly through a vertically oriented boiler unit and thence over into an economizer unit, such as 4. That portion of fly ash material together with some calcium and magnesium sulfates which are relatively heavy and fail to carry over from the upper boiler unit 1 will settle into a lower hopper zone 5 to be removed through outlet means 6 into an ash pit or other removal means not shown. The hot flue gas stream, with entrained material, is indicated in the present embodiment as carrying through the economizer unit 4 by way of duct 7 into air preheater 8 and thence outwardly through duct means 9. At the air preheater 8, a suitable flow of atmospheric air is passed thereto by way of inlet 10 and thence outwardly from outlet 11 to duct means 3 such that a heated air stream is made available for introduction into a high temperature boiler zone 1.

In accordance with the present invention, crushed or powdered limestone and/or dolomite additive is made available from hopper means 12 and valve means 13 to a separate inlet duct 2' such that approximately 10%, or more, by weight of the coal, of alkaline additive is available to carry through the high temperature boiler zone. Injecting air or other dispersion gas, may be supplied to duct 2' from a suitable supply source not shown. Thus, in this system, the resulting compounds from the alkaline material added into the high temperature burning zone will carry through from the latter into the economizer 4, the air preheater 8, the transfer duct means 9 and then into the subsequent scrubbing zone or zones, such as provided by tower means 14. Where limestone and dolomite are both used as alkaline materials, there will be an initial conversion to calcium and magnesium oxides and then a mixture of these active oxides combine with $SO_2$ to provide resulting calcium and magnesium sulfate and sulfite compounds which are in a relatively stable form so as to carry entirely through the duct system to the scrubber zone 14. Generally, about 50% of the $SO_2$ has been shown by tests to be converted to the fairly stable sulfate and sulfite compounds. Some of the remaining calcium and magnesium oxide materials which are formed in the high temperature boiler zone will tend to revert to calcium and magnesium carbonates, as heretofore noted, as the temperature decreases through the rest of the heat exchange and duct portion of the system. As a result, relatively insoluble calcium and magnesium carbonate materials are entrained with the fly ash and remaining $SO_2$ in the flue gas stream such that they are continuously available to add to the alkalinity of the recirculating aqueous stream descending through scrubber tower 14 by way of an inlet line 15 and liquor distributor means 16.

For purposes of simplification, there is illustrated a single scrubber tower 14 having two superposed contact stages 17 and 18, with each stage having a multiplicity of mobile light weight contact elements 19. However, for a power plant unit having a large volume of flue gas, there may be two or more similar type scrubber towers provided to adequately effect the countercurrent scrubbing of the total gaseous stream. In each instance, the gas stream enters the lower portion of a scrubber tower 14 from inlet conduit means 9 such that there may be a vertically rising gas flow through the entire height of the tower. Also, preferably, in the lower zone, there is effected a presaturation or humidification of the gas stream by means of water flow from spray means 20 which in turn is suppled by line 21 having control valve 22. Such water spray means will provide a precooling of the gas stream and an initial separation of entrained particles, as well as the desired humidification thereof prior to its flowing upwardly through the superposed contact stages 17 and 18.

In order that there is obtained the highest efficiency from the special form of scrubber tower, the opposing gas and liquid flows are adjusted so that there is random turbulent motion of all of the contact elements 19 in each vertical stage, whereby there is, in turn, a maximum efficiency obtained from the constant rotational effect and large surface area being presented by each individual element to the rising gas stream and to the descending liquid absorption stream from spray nozzles 16. Generally, for each contact stage, the contact elements 19 will fill the space or volume between the perforated retainer plates 23 to less than 30% of such volume when the elements are at rest, with neither liquid nor gas flow through the unit.

In view of the substantial quantity of alkaline additive (by way of oxides and carbonates of calcium and magnesium), carrying through to the scrubber zone 14 there will be a resulting continuous addition of alkalinity to the descending scrubbing stream so as to effect absorption of the sulfur dioxide into the liquor that carries into lower zone 24 and subsequently into a hold tank 25. However, for purposes of closely controlling pH of the recirculating stream through line 15 there may be provision for adding further calcium carbonate, calcium hydroxide, ammonium hydroxide, sodium carbonate, or other alkaline material, such as by way of line 26 with control valve 27 into line 28 which in turn is connective with the aforesaid line 15. In this instance, recirculation is indicated as being provided through line 29 and pump means 30 which takes suction from the aforesaid hold tank 25. In the hold tank there is an initial separation of the alkaline slurry stream from particulates, including fly ash and precipitated sulfate-sulfide compounds, whereby there may be the desired continuous circulation of the alkaline water stream through scrubber tower 14.

Inasmuch as the preferred system minimizes the addition of limestone or other alkaline material by conserving a greater portion of the alkaline slurry for recirculation purposes, there may be additional particle thickener or removal means so as to effect further concentration of the solids prior to their discharge from the system. In other words, from hold tank 25 there may be withdrawal of settled slurry by way of line 31, pump 32 and line 33 into a suitable second hold tank or thickener unit 34. The latter provides for still further concentration of solids materials which may be withdrawn from the lower portion thereof by way of line 35 while alkaline liquid or slurry is withdrawn by way of line 36 and pump 37 for discharge into line 28 in turn carrying to the recirculation line 15. On the other hand, where it is desired to retain the maximum use of certain of the calcium and magnesium values, some recirculation of slurry may be made from line 31 through line 45 and control valve 46.

The scrubbed, substantially $SO_2$ free, flue gas stream leaving the upper portion of scrubber tower 14 is shown as passing through suitable mist extractor means 38 and carrying into an outlet duct 39 and fan 44. The duct 39 will normally connect directly to suitable stack means, not shown in the present drawing. Where desired, and in order to preclude a white plume from entrained moisture carrying to the stack outlet, there may be the addition of heat to the cleaned flue gas stream ahead of the outlet. For example, the present embodiment indicates a fuel burner means 40 as discharging into duct 41 which in turn connects with duct means 39 so as to supply high temperature burner gas into admixture with the flue gas stream leaving tower 14. Fuel and air to the burner means 40 are indicated as being supplied respectively through lines 42 and 43. In all cases, the heated air stream added to the stack gas from fuel burner means 40 should be kept to a minimum in order to conserve fuel but, at the same time, shall add sufficient heat to the discharge gas stream so as to preclude having a large quantity of white plume from moisture condensation at the stack discharge.

It should be pointed out that the present embodiment is only diagrammatic with respect to the means for thickening and discharging the precipitates and fly ash recovered from the scrubbing zone as well as diagrammatic with respect to the means for effecting the recirculation of the alkaline water scrubbing stream that is carried down through the scrubber tower 14 in a continuous manner. For example, a preferred system may provide for connecting a differential pressure controller, 49, by lines 47 and 48 across the height of the scrubber unit 14 to maintain collection and absorption efficiencies. In other words, a constant pressure drop can be maintained across the tower 14 by means of the differential pressure controller 49, to control valve 50 located in the recirculation slurry line 15. By this means, any variation in gas flow can be compensated by either increasing or decreasing this recirculated liquor flow so as to maintain constant pressure drop across the scrubber.

Obviously modifications may also be made with respect to the particular means or with regard to the types of thickener apparatus for effecting the handling of the slurry leaving the scrubber zone 14 at the lower reservoir end 24 at the zone of the hold tank 25, or at thickener 34.

Also, it should be noted that the present drawing is diagrammatic with respect to the power plant unit, including the economizer 4 and air preheater 8, inasmuch as various types or forms of heat recovery units and duct means may be utilized to advantage to provide the transfer of the laden hot flue gas stream leaving the boiler unit 1 and carrying to the integrated scrubber section as provided by the present improved system.

The description hereinbefore set forth has indicated that a combination of limestone and dolomite may be injected into the boiler zone; however, where desired, either limestone or dolomite alone may be used as the alkaline additive material and good results provided in the present integrated system. On the other hand, where the cost is not prohibitive, still other powdered alkaline materials as have been noted, may be added so as to be carried through the high temperature boiler zone; subsequent heat recovery zones and duct work to the scrubbing unit, where the particular alkaline additive material will combine with the recirculated liquor stream to supply at least a portion of the alkalinity required for the completion of $SO_2$ removal in the overall system. Generally, better than 90% $SO_2$ removal is accomplished along with a 98.5%+ removal of fly ash.

Reference to the following examples will serve to still further clarify the efficiency and advantages obtained for the present integrated system in effecting a clean up of a flue gas stream from a power plant which burns coal, whereby there is $SO_2$ and fly ash removal along with a substantial reduction in nitrogen oxides.

EXAMPLE I

In one test operation, two identical coal burning boilers being operated at the same general location, were subjected to steady state operations with one boiler receiving 5% limestone injection along with the powdered coal while the other received no limestone. In this test of several runs, the results showed that the boiler #1 (with the 5% limestone) there was an average of 0.114 volume percent of $SO_2$ remaining in the flue gas, while at the same time the boiler #2, having no additive, there was an average of 0.123 volume percent of $SO_2$ in the flue gas stream. It thus appeared that 5% limestone, by weight of the coal, had negligible effect upon $SO_2$ removal.

EXAMPLE II

Another test operation was carried out which was similar to Example I, except that 10% limestone was added to the #1 boiler, in place of the 5% quantity. In this case, for most all runs, there was about half as much $SO_2$ in the #1 boiler flue gas stream as occurred in the flue gas stream from boiler #2. For instance, a typical run showed 0.0720 volume percent $SO_2$ contained in the boiler #1 flue gas stream and 0.135 volume percent in the boiler #2 flue gas stream.

It should also be pointed out that the data for these runs, utilizing the 10% limestone addition and effecting an $SO_2$ reduction by approximately 50%, were with respect to an analysis of the flue gas stream ahead of a scrubber section. In other words, the $SO_2$ reduction occurred primarily in its combination with CaO to form calcium sulfate, and perhaps a small quantity of calcium sulfite, both of which would be subsequently scrubbed out of the flue gas stream along with the fly ash and the remaining $SO_2$.

EXAMPLE III

In a series of test operations for $SO_2$ absorption, a powdered coal burning boiler flue gas stream, at a cooled temperature of about 250° F., was subjected to varying liquid-gas scrubbing ratios ($L/G$) in a two stage countercurrent scrubber unit. In each case, the scrubbing liquor was controlled to provide a 5% calcium carbonate ($CaCO_3$) liquid strength and was passed downwardly through the tower over 1½" diameter light weight hollow plastic spheres which were maintained in turbulent random motion by virtue of the upflowing gas stream. (The spheres, at rest, provided approximately 10 inches of depth in each stage between perforate grids about 4 feet apart.)

With a gas velocity of 750 feet per minute and liquid rates at 30, 40 and 50 gallons per minute, per square foot of scrubber area, there were respectively $SO_2$ absorption efficiencies of 79.8%, 82.2% and 83.6%. For reference, a curve "A" is shown in the accompanying FIG. 2 which results from the plotting of the $SO_2$ removal efficiencies.

EXAMPLE IV

In another series of test operations, the $SO_2$ scrubbing was carried out in a manner the same as for Example III except that a 5% sodium carbonate ($Na_2CO_3$) scrubber liquor was utilized in the scrubber unit in lieu of the 5% $CaCO_3$ solution. In these tests, with a gas velocity of 750 feet per minute and liquid rates at 30, 40 and 50 gallons per minute per square foot of area, there were approximate efficiencies of 92%, 94.4% and 96%. For convenience, a curve "B" is shown in FIG. 2, which curve resulted from a plurality of test runs.

The results of the tests of Examples III and IV, of course, show that sodium carbonate is superior to calcium carbonate in scrubbing efficiency. However, the particular advantage of the use of limestone or dolomite, in the process of this invention, is the low cost while obtaining the benefit of the formation of an alkaline scrubbing stream obtained in part from the carry through to resulting calcium and magnesium carbonates which will be provided by reversion of oxides formed in the high temperature boiler zone.

Actually, with calcium and magnesium oxides and carbonates being formed from the high temperature zone, there will be absorption efficiencies in the present system which will exist between the calcium carbonate and calcium hydroxide values, with the latter being the higher.

EXAMPLE V

In a series of test runs, where calcium carbonate and dolomite were separately used in the scrubber, there were analyses of the resulting treated flue gas flows to determine nitrogen oxides removal.

In one test run, where $CaCO_3$ had been added to the scrubber and with a gas inlet flow to the scrubber section of 1000 cubic feet per minute there was an initial nitrogen oxide content in gas of about .0161 volume percent (on a dry basis). After scrubbing, merely using 1 stage of countercurrent contact in the presence of the turbulently moving light weight spheres, there was found approximately .0130 volume percent nitrogen oxides to thus result in a 19.3% removal thereof.

In another similar test run, except for a slightly lower gas inlet flow of 908 cubic feet per minute, there was a decrease from .0133 to .0102 volume percent to indicate a removal efficiency of 23.3%.

In still another test run, using dolomite addition instead of $CaCO_3$ and having a still lower gas inlet flow of about 750 cubic feet per minute, there was reduction from .0155 to .0121 volume percent to provide a 21.9% removal efficiency. Thus it appears that nitrogen oxides removal efficiency is of the order of 20% independent of the particular absorbent used.

EXAMPLE VI

For purposes of illustrating a typical treating system for flue gas from a coal burning power plant the following data are set forth as being in line with results developed from test operations for the present improved form of treating system:

Design basis

Plant type—Pulverized coal power boiler
Plant capacity—200 megawatts
Flue gas flow—475,000 s.c.f.m.; 724,000 c.f.m. @ 330° F.
Flue gas composition:
  $CO_2$—12.79 vol. percent
  $H_2O$—8.03 vol. percent
  $SO_2$—0.19 vol. percent
Fly ash dust loading—4.5 gm. s.c.f.
Coal burning rate—78 ton/hr.

Performance specifications

Countercurrent gas-liquid scrubber—UOP Air Correction Division Turbulent Contact Absorber, i.e., TCA Scrubber Model No. 4000
TCA scrubber dimensions—15 ft. x 27 ft. x 40 ft. high
Number of stages—2
Number scrubbers required—1

Duty—Fly ash and SO₂ removal
Scrubbing liquor—Water
Make-up water rate—340 g.p.m.
Limestone addition rate—11.3 ton/hr. (To the boiler)
Pressure drop—4.5 inches of water gage
SO₂ absorption efficiency—95%
Particulate collection efficiency—98%

We claim as our invention:

1. A system for simultaneously removing SO₂ and fly ash from a flue gas stream resulting from the burning of coal, which comprises the steps of, introducing a powdered alkaline material into the burning zone of the power plant and thereby producing sulfate and sulfite compounds along with oxides and carbonates which will carry along with fly ash particles in a resulting flue gas stream, introducing such stream and resulting entrained compounds into a scrubbing zone to pass countercurrently to a descending alkaline scrubbing slurry stream, with the alkalinity of the latter being obtained in part from the reaction of such resulting oxides and carbonates carrying into the aqueous stream circulating within said scrubbing zone and, in part from an added alkaline material introduced to said zone to control the pH of said scrubbing stream, in addition effecting the countercurrent scrubbing step in said scrubbing zone in the presence of a multiplicity of mobile contact elements providing rotating surfaces, effecting the removal of recovered fly ash material and resulting dissolved and precipitated sulfates and sulfites from the lower portion of said scrubbing zone and from said scrubbing stream, and, at the same time, permitting the discharge of a substantially cleaned flue gas stream from the upper portion of said scrubbing zone.

2. The system of claim 1 further characterized in that said alkaline material being introduced into the burning zone comprises a material selected from the group consisting of limestone, dolomite, and the mixture of limestone and dolomite, in an amount providing at least about 10% by weight of the coal.

3. The system of claim 1 further characterized in that said resulting flue gas stream leaving the high temperature burning zone of the power plant is subjected to indirect heat exchange with cooler heat exchange mediums whereby to reduce the temperature of the flue gas stream being introduced to said scrubbing zone to below about 350° F.

4. The system of claim 1 further characterized in that humidification water is sprayed into said gaseous stream upstream of the countercurrent scrubbing in the presence of said movable contact elements.

5. The system of claim 1 further characterized in that the quantity of water circulating through said scrubbing zone is regulated responsive to the pressure drop therethrough whereby to maintain a desired pressure drop range for said gaseous stream.

6. The system of claim 1 further characterized in that said descending alkaline scrubbing stream carrying to the lower portion of said scrubbing zone with recovered precipitates and fly ash is separated from such solid materials and is recirculated to the upper portion of said scrubbing zone to provide at least a portion of said descending scrubbing stream.

7. The system of claim 6 still further characterized in that calcium carbonate is added to said recirculating stream to maintain at least about a 5% calcium carbonate solution in the scrubbing zone.

8. The system of claim 5 further characterized in that calcium hydroxide is added to said recirculating stream to maintain a pH in the range of about 5.0 to 7.0 for such stream.

9. The system of claim 1 further characterized in that said movable light weight contact elements comprise hollow plastic in the size range of from about 1½" to about 3" providing a weight of about 6 pounds per cubic foot of volume in the settled state.

10. The system of claim 1 further characterized in that the pH of said scrubbing stream is maintained in the range of about 5.0 to about 7.0.

References Cited

UNITED STATES PATENTS

| | | | |
|---|---|---|---|
| 3,122,594 | 2/1964 | Kielback | 23—2 X |
| 3,320,906 | 5/1967 | Domahidy | 110—1 |
| 3,350,075 | 10/1967 | Douglas | 55—73 X |
| 3,411,864 | 11/1968 | Pallinger | 23—2 |

EARL C. THOMAS, Primary Examiner

U.S. Cl. X.R.
23—178; 110—1